Feb. 5, 1957  B. P. MIDDLESTETTER  2,780,313
SPRING MOTOR
Filed Jan. 10, 1955  3 Sheets-Sheet 1

INVENTOR.
Brewster P. Middlestetter
BY
HIS ATTORNEYS

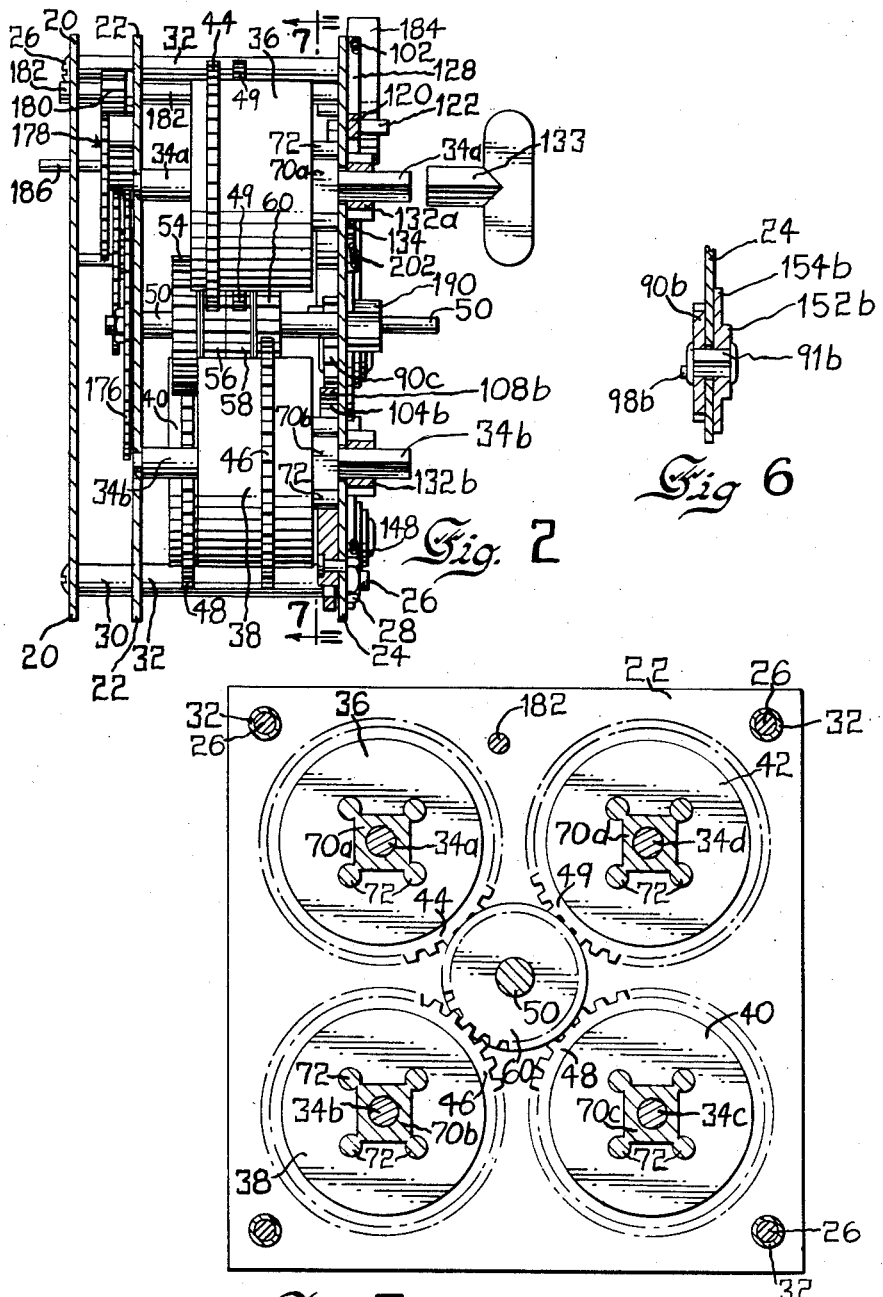

Feb. 5, 1957 B. P. MIDDLESTETTER 2,780,313
SPRING MOTOR
Filed Jan. 10, 1955 3 Sheets-Sheet 3

INVENTOR.
Brewster P. Middlestetter
BY
HIS ATTORNEYS

United States Patent Office 2,780,313
Patented Feb. 5, 1957

2,780,313

SPRING MOTOR

Brewster P. Middlestetter, Lewisburg, Ohio

Application January 10, 1955, Serial No. 480,872

8 Claims. (Cl. 185—9)

This invention relates to a spring motor assembly. The invention relates more particularly to a spring motor assembly utilizing a plurality of spring motors and a common drive shaft, so constructed and arranged that essentially only one of the spring motors provides power to the drive shaft at any given time.

It is found highly advantageous to provide a plurality of spring motors or a plurality of springs within an assembly for the purpose of driving a common shaft rather than to have a single spring motor or spring to drive the shaft. It is found that if a single spring or spring motor is employed, a considerably greater amount of space is required in order to provide sufficient driving force over a given period of time. Furthermore, a single spring of a sufficiently large size may exert a greater driving force than is necessary over a portion of the driving period and then the same spring may exert less than sufficient driving force over the remainder of the desired driving period.

An object of this invention is to provide a spring motor assembly having a plurality of spring motors drivingly connected to a common drive shaft in which each of the spring motors functions independently of the other spring motors.

Another object of this invention is to provide a spring motor retaining and releasing mechanism which prevents operation of any given motor until an adjacent spring motor has essentially exhausted its energy.

Another object of this invention is to provide a spring motor assembly having a plurality of spring motors in which each of the spring motors may be wound separately.

Another object of the invention is to provide a spring motor assembly having a plurality of motors which are wound separately and in which the winding operation automatically resets timing and release mechanisms.

Another object of the invention is to provide a spring motor assembly in which a common drive shaft may be locked against rotation at any stage of the operation of the spring motors.

Other objects and advantages reside in the construction of parts, the combination thereof and the mode of operation, as will become more apparent from the following description.

In the drawings, Figure 1 is a front elevational view of the spring motor assembly of this invention disclosing the front or outer side of one of the frame plates thereof. This view also shows a portion of the control mechanism attached to the plate as the mechanism appears with the energy of some of the spring motors having been exhausted.

Figure 2 is a sectional view taken substantially on line 2—2 of Figure 1.

Figure 6 is a sectional view taken substantially on line 6—6 of Figure 1.

Figure 7 is a sectional view taken substantially on line 7—7 of Figure 2. This view shows another frame plate of the assembly with the spring motors attached thereto.

Figure 1:
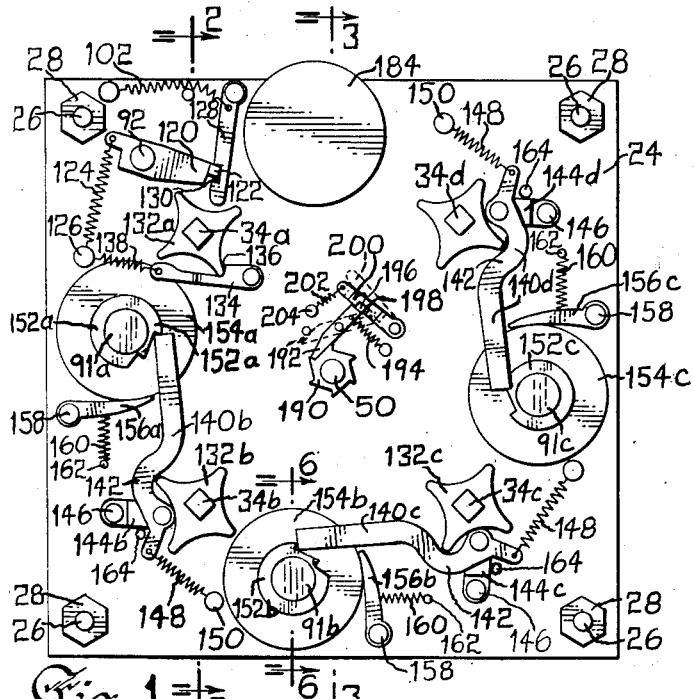

Referring in detail to the drawings, the frame structure of a spring motor assembly of this invention comprises three plates 20, 22 and 24, retained in substantially parallel relationship by means of a plurality of bolt members 26 having nuts 28. About each bolt member 26 is disposed a sleeve member 30 intermediate the plates 20 and 22 and a sleeve member 32 intermediate the plate members 22 and 24.

Rotatably carried by the plate members 22 and 24 and disposed in parallel relationship therebetween are shaft members 34a, 34b, 34c and 34d. Rotatably mounted upon the shaft members 34a, 34b, 34c and 34d and concentric therewith are cylindrical drum members 36, 38, 40 and 42, respectively. Integrally attached to the drum 36 at the periphery thereof is an annular gear 44. Likewise attached to the drum 38 at the periphery thereof is a gear 46, and integrally attached to the drums 40 and 42 are gear members 48 and 49, respectively.

As shown in Figure 7, the drums 36, 38, 40 and 42 are disposed in a somewhat rectangular configuration. At the center of the rectangular configuration is a main drive shaft 50 rotatably journaled in plates 22 and 24. Fixedly attached to the main drive shaft 50 in aligned relation are a pair of toothed cylinders 52. Rotatably carried upon the shaft 50 and encircling the toothed cylinders 52 are ratchet gear wheels 54, 56, 58 and 60. Within each of the ratchet gear wheels 54, 56, 58 and 60 are a plurality of pawl fingers 62, each of which is resiliently biased by means of a spring member 64. Pin members 66 aid in guiding the resilient movement of the spring members 64.

Figure 5:
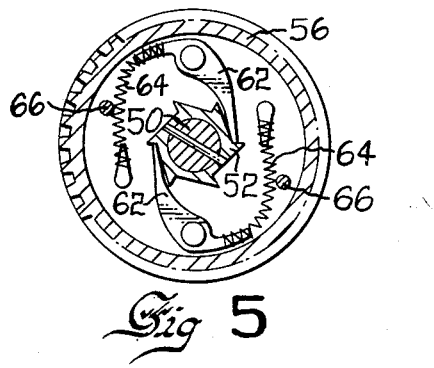
Figure 5 is an enlarged sectional view taken substantially on line 5—5 of Figure 3.

The toothed cylinders 52, in cooperation with the pawl members 62, provide means by which the gear wheels 54, 56, 58 and 60 may drivingly operate the main drive shaft 50 in only a clockwise direction as viewed in Figure 5. Each of the annular gears 44, 46, 48 and 49 is attached to its respective drum 36, 38, 40 or 42, in a different axial position, as clearly shown in Figures 2 and 3. Thus, the annular gear 44 drivingly engages the ratchet gear 56; the annular gear 46 drivingly engages the ratchet gear 60; the annular gear 48 drivingly engages the ratchet gear 54; and the annular gear 49 drivingly engages the ratchet gear 58.

Within each of the drums 36, 38, 40 and 42 is a power spring member (not shown). Each of these power spring members is attached internally within its respective drum and is also attached to its respective shaft 34. The power spring within each drum is separately wound by means of its respective rotatable shaft 34. Hence, the assembly shown and described herein comprises four spring motors aligned in substantially parallel relationship.

Integrally attached to each of the drum members 36, 38, 40 and 42, adjacent the plate 24 and concentric therewith, is a square axial projection 70a, 70b, 70c and 70d respectively. Each of the square projections 70a, 70b, 70c and 70d is provided with an elongate boss 72 at each corner thereof, as clearly shown in Figures 4, 7 and 9.

Figure 4:
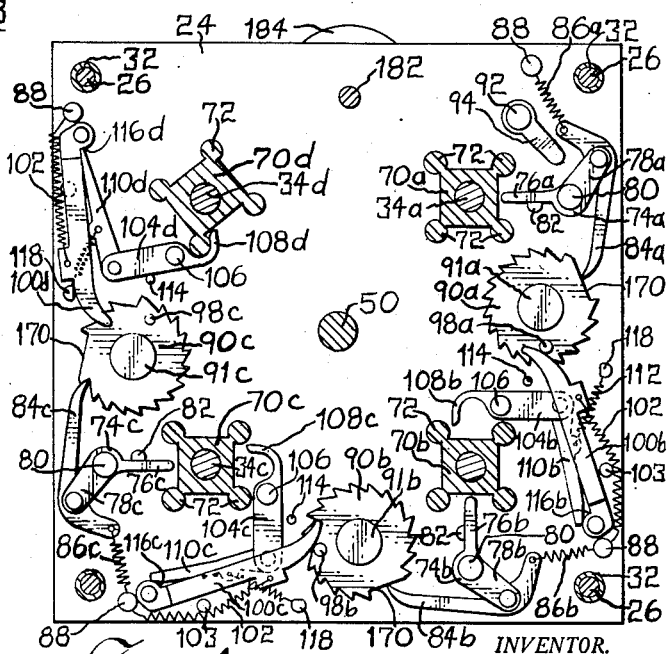
Figure 4 is a sectional view taken substantially on line 4—4 of Figure 3. This view shows the reverse side or inner side of the frame plate disclosed in Figure 1.

Integrally attached to the inner surface of the plate 24 adjacent the square projections 70a, 70b and 70c is a crank member 74a, 74b and 74c respectively, comprising arms 76a, 76b and 76c and 78a, 78b and 78c, respectively. There are three crank members 74, there being one crank member adjacent each of the drums 36, 38 and 40. Each of the crank members 74 is pivotally attached to the plate 24 by means of a pintle 80. As shown in Figure 4, a fixed pin 82, attached to the plate 24 adjacent the pintle 80, is adapted to be engaged by the arm 76 of the crank 74 adjacent thereto in the deactuated position of the crank 74.

Pivotally attached to the arm 78 of each crank 74a, 74b and 74c adjacent the end thereof is a pawl 84a, 84b and 84c, respectively. One end of a spring 86a, 86b and 86c is attached to the rearward end of the pawl 84a, 84b and 84c respectively. The other end of the spring 86 is attached to the plate 24 by means of a pin 88. The forward end of the pawls 84a, 84b and 84c is slightly arcuated and is adapted to engage an adjacent timing gear 90a, 90b and 90c, respectively. Each of the timing gears 90a, 90b and 90c is fixedly attached to a shaft 91a, 91b and 91c, respectively, which extends through the plate 24.

Figure 9:
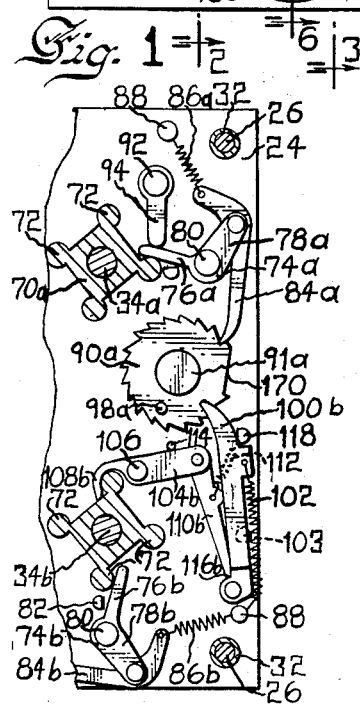
Figure 9 is a fragmentary view of the structure shown in Figure 4, which is the reverse side of the plate shown in Figure 1. This view discloses the mechanism on the reverse side under the same conditions assumed in Figure 8.

Attached to the plate 24 adjacent only the drum 36 is a rotatably mounted shaft 92 extending through the plate 24. Fixedly attached to the shaft 92 at the inner surface of the plate 24 is an arm 94. When the arm 94 is turned toward the square projection 70a of the drum 36, as shown in Figure 9, the drum 36 cannot rotate due to the fact that one of the boss members 72 engages the arm 76a of the crank 74a and the arm 76a engages the end of the arm 94, preventing rotational movement of the square projection 70a. The arm 94 is usually positioned as shown in Figure 9 when the spring within the drum 36 is in a wound condition and ready for operation.

Intermediate the drums 36 and 38 is the timing gear 90a; intermediate the drums 38 and 40 is the timing gear 90b and intermediate the drums 40 and 42 is the timing gear 90c. The timing gears 90a, 90b and 90c are provided with protuberances 98a, 98b and 98c, respectively, adjacent the peripheral edge thereof.

Elongate contact arms 100b, 100c and 100d are pivotally attached to the plate 24 adjacent the drums 38, 40 and 42, respectively. Each elongate contact arm 100 is biased by means of a spring 102. Each spring 102 has one end thereof attached to its respective arm 100 and the other end thereof attached to the pin 88. Each spring 102 contacts an adjacent pin 103 attached to the plate 24. The pin 103 is comparatively short and is not engageable by its respective arm 100 during pivotal movement thereof. The drum 38, 40 or 42 may be retained from operation by means of the elongate arm 100, adjacent thereto, and its associated linkages. Adjacent the elongate contact arms 100b, 100c and 100d are locking fingers 104b, 104c and 104d, respectively, each of which is pivotally connected to a pin 106 of the frame plate 24. Each of the locking fingers 104b, 104c and 104d has an arcuate portion 108b, 108c and 108d, respectively, at one end thereof. At the other end of the locking fingers 104b, 104c and 104d is pivotally attached an elongate latch member 110b, 110c and 110d respectively, which is resiliently biased by means of a spring 112 attached to the frame plate 24.

When the drum adjacent one of the latch members 110 is in a wound condition and in readiness for operation, it is locked from rotation by means of the locking finger 104 adjacent thereto which is pivotally forced against a stop pin 114 by means of its respective latch 110. One end of the latch 110b, 110c and 110d is positioned upon a shoulder 116b, 116c and 116d respectively, of its respective contact arm 100 when its respective latch 110 is in latched position. The contact arm 100 is pulled into its position against a stop pin 118, as shown in Figure 9, by the spring member 102.

On the outer surface of the plate 24 are a plurality of linkage and lever members which cooperate with the above described mechanisms on the inner surface of the plate 24.

The shaft 92 which extends through the plate 24 has at one end thereof the arm 94 attached thereto on the inner side of the plate 24 adjacent the square projection 70a, as described above. On the outer side of the plate 24, attached to the shaft 92 and rotatable therewith, is a control arm 120. The control arm 120 is provided with a projection stem 122 at the end thereof and normal thereto. At the other end of the control arm 120 is attached a spring 124. The spring 124 is also attached to a fixed pin 126 of the plate 24.

Figure 8:
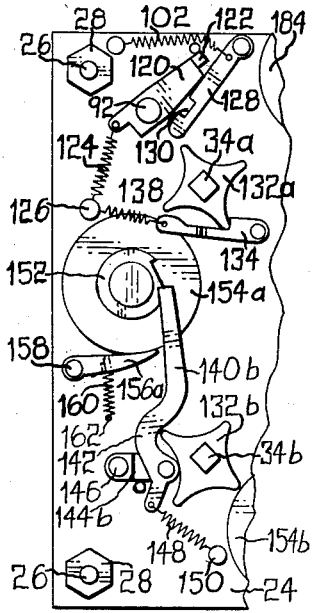
Figure 8 is a fragmentary view of the structure disclosed in Figure 1, showing the brake and release mechanism of the spring motor assembly in a brake position and in readiness for operation.

The spring 124 biases the arm 120 and urges counterclockwise movement thereof as shown in Figures 1 and 8. As is readily understood, the movement of the control arm 120 attached to the shaft 92 governs the position of the arm 94 on the reverse side of the plate 24 which is also attached to the shaft 92. The control arm 120 is used for controlling the operation of the drum 36. The control arm 120 is latched into released position, as shown in Figure 1, by a latch arm 128 which is provided with a recess 130 which receives the projection 122 of the arm 120. When the arm 94 on the inner or reverse side of the plate 24 is in the position shown in Figure 9, the control arm 120 on the outer or front side of the plate 24 is in the position as shown in Figure 8.

Each of the rotatable shafts 34a, 34b, 34c and 34d has a portion thereof, rectangular in cross section, extending through the plate 24. Fixedly attached to the rectangular projection of each shaft 34a, 34b, 34c and 34d is a wing wheel 132a, 132b, 132c and 132d, respectively.

When each spring motor is wound, its respective shaft 34 is rotated in a clockwise direction, as viewed in Figure 1, by a winding stem 133 of the type shown in Figure 2. When the shaft 34a for the drum 36 is rotated in a clockwise direction, one of the wings of the wing wheel 132a attached thereto engages the end of the arm 128, releasing the control arm 120 from the recess 130 of the arm 128. When the control arm 120 is released from the latch arm 128, it assumes the position shown in Figure 8. The arm 94 on the reverse side of the plate 24 is thus moved to position as shown in Figure 9, which locks the drum 36 against rotation. With the drum 36 thus locked against rotation, the winding process continues until the spring within the drum 36 is completely wound.

A catch bar 134 pivotally attached to the plate 24 adjacent the drum 36 is provided with a shoulder 136. This shoulder 136 of the catch bar 134 is engageable by the wing portions of the wing wheel 132a adjacent thereto. This catch bar 134 prevents the shaft 34a of the drum 36 from rotating in a reverse or counterclockwise direction at any time. The catch bar 134 is resiliently biased by means of a spring 138, one end of which is attached to the catch bar 134 and the other end thereof is attached to the pin 126. The other wing wheels 132b, 132c and 132d are attached to their respective shafts 34b, 34c and 34d. Each of the wing wheel members 132b, 132c and 132d are rotatably moved as their respective shafts 34b, 34c and 34d are individually rotated by the winding stem 133 during the winding process. These wing wheels 132b, 132c and 132d operatively engage elongate operating rods 140b, 140c and 140d, each of which has an arcuate portion 142. Each of the operating rods 140b, 140c and 140d is pivotally attached to a link 144b, 144c and 144d, respectively. Each link 144b, 144c and 144d is pivotally attached to the plate 24 by means of a pin 146. As the wing wheels 132b, 132c and 132d of the shafts 34b, 34c and 34d, respectively, of the drums 38, 40 and 42, respectively, are operatively and individually rotated by the winding stem 133, the rotation being in a clockwise direction, the wing portions of the wing wheels 132b, 132c and 132d engage the arcuate portion 142. This engagement by each of the wing wheels 132b, 132c and 132d with the arcuate portion 142 of its respective rod member 140 moves the rod 140 substantially longitudinally as the rod 140 pivotally moves upon the link 144 as the link 144 pivots about the pin member 146.

The end of each rod 140 adjacent its respective wing wheel 132 is resiliently biased by means of a spring 148 which is attached to the rod 140 and is also attached to a pin 150 of the plate 24. The other end of each rod 140b, 140c and 140d operatively engages a notched wheel 152a, 152b and 152c which is attached to its respective shaft 91a, 91b and 91c of the respective timing gears 90a, 90b and 90c positioned on the reverse side of the plate 24. Rotational movement of the notched wheel 152 by its respective rod 140 properly adjusts the rotational position of its respective timing gear 90.

Also attached to the shaft 91a, 91b and 91c and concentric therewith is a brake disc 154a, 154b and 154c. Each brake disc 154a, 154b and 154c is forceably engaged by a brake arm 156a, 156b and 156c which pivots about a pin 158. Each brake arm 156 is pressed against its respective brake disc 154 by means of a spring 160 which is compressed between the brake arm 156 and a pin 162. Each brake arm 156 engaging its respective brake disc 154 prevents reverse rotation of its respective timing gear 90 which is positioned on the reverse side of the plate 24. The end of the catch bar 134 is bent outwardly away from the plate 24 so that the catch bar 134 does not contact the brake disc 154a.

The return movement of each rod 140 which is actuated by its respective spring 148 is limited by means of a pin 164, which is engaged by the link 144. Therefore, engagement of a wing portion of each wing wheel 132 within the arcuate portion 142 of the rod 140, as shown in Figure 1, prevents counterclockwise rotation of the shaft 34 and thus prevents unwinding of the power spring member within its respective drum. Thus it is understood that the spring within each of the drums 42, 40, 38 and 36 is wound by means of its respective shaft 34. During the winding process of each shaft 34, the timing gear 90 adjacent thereto is automatically adjusted so that an adjacent spring motor will be actuated into operation when the energy of the preceding spring motor is practically exhausted.

The control arm 120, in the position as shown in Figure 1, is so adjusted that the drum 36 is permitted to rotate. The elements shown in Figures 1, 2 and 4 are disclosed in the positions which they assume when the force of the springs within the drums 36 and 38 has been exhausted. In Figure 4 the square projection 70c of the drum 40 is shown released but the timing gear 90c adjacent thereto has not been rotatably moved by its respective pawl 84c. This position of the timing gear 90c intermediate the drums 40 and 42 indicates that the spring motor corresponding to the drum 40 has been actuated for operation.

Mode of operation

The elements attached to the plate 24 have moved to their respective positions as shown in Figures 1 and 4 in the following manner. First, the control arm 120 has moved from its position shown in Figure 8 to the position shown in Figure 1. This, as described above, released the drum 36 for rotation. During the rotational operation of the drum 36, the square projection 70a has rotated. Thus, the boss portions 72 thereof have engaged the arm 76a of the crank 74a and the crank 74a has thus been forced to pivotally move by the rotation of the drum 36. The pawl 84a adjacent the drum 36 has reciprocally engaged the timing gear 90a intermediate the drums 36 and 38 and rotated said timing gear 90a until the protuberance 98a thereof has engaged the arcuate portion of the elongate contact arm 100b. Thus, the protuberance 98a of the timing gear 90a has caused the contact arm 100b to pivot as shown in Figure 4, releasing the latch 110b adjacent the drum 38 and thus releasing the arm 104b adjacent thereto which disengages the arcuate portion 108b thereof, so that the square projection 70b of the drum 38 may move.

Each timing gear 90 and the pawl mechanism 84 adjacent thereto by which the timing gear is operated has been so constructed that one revolution of the timing gear 90 is made while the drum by which it is operated expends practically all of its energy. Thus, the protuberance 98 of the timing gear 90 engages the contact arm 100 of the next succeeding spring motor when the preceding spring motor has substantially exhausted its energy.

Upon each revolution of a drum the projection 70 thereof naturally makes one revolution. Due to the fact that each projection 70 is provided with four elongate boss portions 72, the crank 74 is actuated four times during each revolution of the drum adjacent thereto. Thus, the pawl 84 attached to the crank 74 is caused to make four reciprocal movements and to engage the teeth of its respective timing gear 90 four times during each revolution of the drum adjacent thereto. Thus, the timing gear 90 is provided with a given number of teeth which enables the timing gear 90 to be actuated by the pawl 84 through one revolution while the power spring of the drum adjacent thereto has rotated its respective drum through a predetermined number of revolutions during which it has thus substantially exhausted its energy.

Thus, the drum 38 has been released for rotation. During the rotation of the drum 38, the timing gear 90b intermediate the drums 38 and 40 has been so rotatably operated by the pawl 84b adjacent the drum 38 that the protuberance 98b of said timing gear 90b engages the contact arm 100c when the energy of the power spring of the drum 38 has practically been exhausted.

As each drum rotatably moves, the gear wheel 44, 46, 48 or 49, integrally attached thereto at the periphery thereof, engages one of the ratchet gears 54, 56, 58 or 60, thus rotating the main drive shaft 50.

The timing apparatus intermediate individual drums is so created that rotation of each drum continues for a short period after a succeeding drum has been actuated for operation. Thus, a very smooth uninterrupted changeover is made when energy applied for rotation of the main shaft 50 is transferred from one spring motor to the succeeding spring motor.

As shown in Figure 4, the square projection 70c of the drum 40 is free to move so that the drum 40 may rotate. This is due to the fact that the arcuate locking portion 108c of the arm 104c adjacent the drum 40 has been released from engagement with one of the boss portions 72 of the square projection 70c of the drum 40. Thus, the power spring of drum 40 is in a position ready to expend its energy. Upon each revolution of the drum 40, each of the boss portions of the square projections 70c thereof engages the arm 76c of the crank 74c adjacent the drum 40. Upon each engagement by the boss portions 72, the crank 74c operatively moves the pawl 84c. The spring 86 returns the pawl 84 after each actuation by its respective crank 74. This pawl movement, of course, rotatably moves the timing gear 90c intermediate the drum 40 and the drum 42.

When each drum 38, 40 and 42 is permitted to individually and freely rotate, the boss portions 72 of the projection 70 thereof engage the arcuate portion 108 of the arm 104 adjacent thereto. However, the arm 104 is free to pivotally move when the latch 110 is not engaged upon the shoulder 116 of the contact arm 100. Therefore, during rotation of each of the drums 38, 40 and 42, its respective arm 104 adjacent thereto is caused to slightly pivot each time it is engaged by one of the boss portions 72. Therefore, the arm 104 does not prohibit rotation of the drum adjacent thereto unless the latch 110 thereof is engaged upon the shoulder 116 of the contact arm 100.

As shown in Figure 4, the timing gear 90c intermediate the drum 40 and the drum 42 is in its first notched position. The timing gear 90c is rotated in a clockwise direction by the pawl 84c until a toothless portion 170 of the timing gear 90c is engaged by the pawl 84c in a manner as shown by the position of the pawls 84a and 84b upon the timing gears 90a and 90b. The timing gear 90c is rotated by the pawl 84c until the protuberance 98c engages the contact arm 100d adjacent the drum 42. The contact arm 100d thus moves toward the drum 42, releasing the latch 110d and permitting pivotal movement of the arm 104d adjacent the drum 42, thus releasing the arcuate portion 108d of the arm 104d from engagement with one of the boss portions 72 of the square projection 70d of the drum 42. Thus, the drum 42 will drivingly engage the drive shaft 50 after the energy of the spring within the drum 40 has been practically exhausted.

As the available energy of the spring within each drum becomes practically exhausted, the drum cannot provide a load upon the main drive shaft 50 as the next succeeding drum begins to rotate. This is due to the fact that these ratchet gears 54, 56, 58 and 60 will ratchet and slip if a force is attempted in the direction of rotation opposite the driving direction of the main drive shaft 50. Therefore, the ratchet gears 54, 56, 58 and 60 act as unidirectional clutch members and cannot transmit any load from the main drive shaft 50 but these ratchet gears can only turn in a direction to provide rotational energy to the drive shaft 50.

Figure 3:
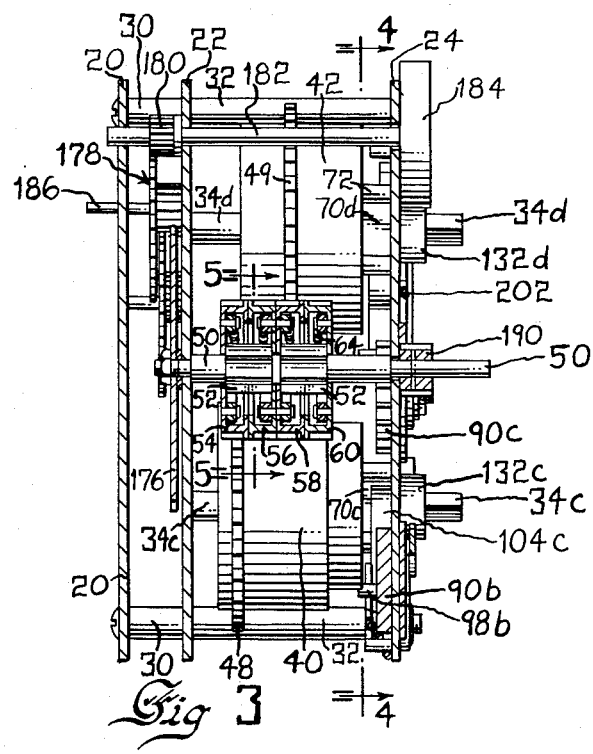
Figure 3 is a sectional view taken substantially on line 3—3 of Figure 1.

Attached to the end of the main drive shaft 50 adjacent the frame plate 22 is a gear wheel 176, shown in Figures 2 and 3, which drivingly engages a speed governor mechanism 178. The speed governor mechanism 178 comprises an auxiliary gear 180 mounted upon a rotatable shaft 182. At the other end of the rotatable shaft 182 is a fly wheel 184 which assists in governing the speed of an output shaft 186.

Any suitable rotational load may be attached to the output shaft 186 to be driven by the spring motor assembly of this invention. At the end of the main drive shaft 50 opposite the gear wheel 176 is a tooth gear 190. Cooperably engaging the tooth gear 190 is a locking arm 192. A spring 194 is attached to the locking arm 192. One end of the arm 192 is adapted to engage one of the tooth portions of the tooth gear 190 for locking rotation of the shaft 50.

In Figure 1 is shown the locked position of the main drive shaft 50. The end of the arm 190 adjacent the spring 194 has a projection 196 adapted to engage within a notch 198 of a latch 200. The latch 200 is resiliently biased by means of a spring 202 which is attached to the end of the latch 200 and is also attached to a pin 204 of the plate 24. The locking mechanism of the arm 192 and the latch 200 is shown in its released position by dotted line in Figure 1.

*Summary*

From the foregoing description, it is understood that the spring motor assembly of this invention provides means by which a plurality of spring motors are operatively attached to a main drive shaft in such a manner that each of the spring motors may provide energy in seriatim relation for rotation of the main drive shaft. The spring motors are so connected one to the other that a first spring motor of the group may be started in operation. This first spring motor, during its operation, automatically operates a timing gear which actuates a second spring motor into operation when the energy of the first spring motor is practically exhausted.

The main drive shaft may be locked from rotation at any time by means of the locking arm 192 and the latch 200. This locking of the shaft 50 indirectly locks from rotation any individual spring motor which may be driving the main shaft 50.

It is further understood that the spring motors of this invention are wound individually and that the winding operation resets all of the timing and starting mechanisms automatically for the reactuation of the plurality of spring motors of the assembly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A spring motor assembly comprising support structure, a drive shaft rotatably carried by the support structure, a plurality of spring motors carried by the support structure, each of the spring motors being rotatably mounted upon a separate shaft, axes of all the shafts being parallel to the drive shaft, a plurality of ratchet gear members, there being one ratchet gear member operably connecting each spring motor to the drive shaft, latch means disposed between adjacent spring motors for retaining the spring motors from operation and for providing in seriatim operation of the motors, timing means operable by each spring motor for actuation of an adjacent latch means, brake means attached to the drive shaft for controlling operation thereof, and winding means attached to each spring motor.

2. In a spring motor assembly including support structure, a plurality of spring motors carried by the support structure disposed in parallel relation and rotatable about separate axes, a plurality of timing gears interposed among the spring motors and carried by the support structure, a plurality of projections extending from each spring motor, a plurality of sets of pawl means; there being one set of pawl means contacting the projections of each spring motor and a timing gear adjacent thereto, each timing gear being operatively engaged and rotated by its respective pawl means during rotation of its adjacent spring motor, control means carried by the support structure adjacent each spring motor and engageable with the spring motor and engageable with an adjacent timing gear for governing the starting of the spring motor, the spring motors thus being individually operable in seriatim relation, and gear means connecting all of the spring motors to a common drive shaft.

3. A spring motor assembly comprising a frame, a plurality of rotatably mounted spring motors carried by the frame, the spring motors being rotatable about separate axes, a common drive shaft supported by the frame adjacent said motors and exterior thereof, a plurality of clutch mechanisms for operably connecting the spring motors to the drive shaft, brake means for each motor, brake means for the common drive shaft, means for releasing each brake means separately, and means responding to the deenergization of one motor for causing the release of the brake means of another motor, the motors thus being operable in seriatim relation.

4. A spring motor assembly, the combination comprising support structure, a plurality of spring motors arranged in parallel relation carried by the support structure, each motor being provided with a separate drive gear, a main drive shaft rotatably carried by the support structure in parallel relation with the spring motors, a plurality of ratchet gear members attached to the main drive shaft and arranged in axial alignment, there being one ratchet gear member for each of the spring motors, the drive gear of each spring motor being in meshed relation with one of the ratchet gear members for rotation of the main drive shaft, each of said spring motors being provided with a rotatable winding shaft for winding of the motor, each motor having an axial projection substantially square in cross section, a plurality of locking mechanisms, there being one locking mechanism supported by the support structure adjacent each motor and operably engageable with the projection thereof for preventing rotation of the motor, a plurality of timing gears, there being a timing gear rotatably carried by the support structure adjacent each of the spring motors, each timing gear having a protuberance thereon, each protuberance being engageable with a locking member for release of said locking member for permitting rotation of the spring motor adjacent thereto, linkage means including a pawl operatively engageable with the axial projection of one of the motors and with one of the timing gears for operation of an adjacent timing gear permitting release of an adjacent locking member, a plurality of wing wheels, there being one wing wheel attached to each of the winding shafts and rotatable therewith, and a plurality of pivotal rods carried by the support structure, there being one rod adjacent each wing wheel and engageable therewith, rotation of each wing wheel causing operation of said rod adjacent thereto, each rod also being operatively engageable with an adjacent timing gear for resetting thereof.

5. In a spring motor assembly including a plurality of spring drum members rotatably mounted in parallel relation, a winding stem extending into each spring drum member, a wing wheel attached to each winding stem exterior of its respective drum member, a gear attached to each spring drum member, a drive shaft mounted in parallel relation to the axis of rotation of the spring drum members, a clutch mechanism connecting each gear to the drive shaft, a plurality of latch mechanisms, there being one latch mechanism operatively connected to each of the spring drum members for releasing the spring drum member for operation, a lever for actuating the latch mechanism of one of the spring drum members, a plurality of timing gears, there being one timing gear adjacent each of the other spring drum members, a plurality of pawl members, there being one pawl member for each wing wheel engageable with the wing wheel and with a timing gear adjacent thereto, each of the other latch mechanisms engaging one of the timing gears and operable thereby.

6. In a spring motor assembly, including support structure, a plurality of spring motors carried in parallel relation by the support structure, a drive shaft rotatably supported by the support structure adjacent the spring motors, a plurality of gear wheels attached to the drive shaft, a plurality of complementary gears attached to said spring motors, there being one complementary gear in meshed relation with each gear wheel of the drive shaft, a winding stem attached to each spring motor, a control mechanism for actuating one spring motor, a plurality of timing gears for actuating the other spring motors, there being one timing gear for each of said other spring motors, each of said spring motors being provided with a bossed projection extending axially therefrom and rotatable therewith, a plurality of pawl mechanisms, there being a pawl mechanism carried by the support structure adjacent each spring motor and engageable with the bossed projection thereof, the pawl mechanism having a portion thereof engageable with a timing gear adjacent thereto for adjusting the timing gear, brake means engageable with each timing gear for controlling the direction of rotation thereof, a plurality of latch members, there being a latch member engageable with each of the timing gears and engageable with the projection of an adjacent spring motor, the latch member being operable by its respective timing gear to release engagement thereof from the projection of its respective spring motor to permit operation of the spring motor.

7. A spring motor assembly, the combination comprising support structure, a plurality of spring motors arranged in parallel relation carried by the support structure, each motor being provided with a separate drive gear, a main drive shaft rotatably carried by the support structure in parallel relation with the spring motors, a plurality of ratchet gear members attached to the main drive shaft and arranged in axial alignment, there being one ratchet gear member for each of the spring motors, the drive gear of each spring motor being in meshed relation with one of the ratchet gear members for rotation of the drive shaft, each motor having an axial projection, a plurality of locking mechanisms, there being one locking mechanism supported by the support structure adjacent each motor and operably engageable with the projection thereof for preventing rotation of the motor, a plurality of timing gears, there being a timing gear rotatably carried by the support structure adjacent each of the spring motors, each timing gear having a protuberance thereon, each protuberance being engageable with a locking member for release of said locking member for permitting rotation of the spring motor adjacent thereto, and linkage means including a pawl operatively engageable with the axial projection of one of the motors and with one of the timing gears for operation of an adjacent timing gear permitting release of an adjacent locking member.

8. A spring motor assembly, the combination comprising support structure, a plurality of spring motors arranged in parallel relation carried by the support structure, each motor being provided with a separate drive gear, a main drive shaft rotatably carried by the support structure in parallel relation with the spring motors, a plurality of ratchet gear members attached to the main drive shaft and arranged in axial alignment, there being one ratchet gear member for each of the spring motors, the drive gear of each spring motor being in meshed relation with one of the ratchet gear members for rotation of the main drive shaft, each of said spring motors being provided with a rotatable winding shaft for winding of the motor, each motor having an axial projection substantially square in cross section, a plurality of locking mechanisms, there being one locking mechanism supported by the support structure adjacent each motor and operably engageable with the projection thereof for preventing rotation of the motor, a plurality of timing gears, there being a timing gear rotatably carried by the support structure adjacent each of the spring motors, each timing gear having a protuberance thereon, each protuberance being engageable with a locking member for release of said locking member for permitting rotation of the spring motor adjacent thereto, linkage means including a pawl operatively engageable with the axial projection of one of the motors and with one of the timing gears for operation of an adjacent timing gear permitting release of an adjacent locking member, a plurality of wing wheels, there being one wing wheel attached to each of the winding shafts and rotatable therewith, and pivotal means carried by the support structure adjacent each wing wheel and engageable therewith and movable thereby, said pivotal means also being operatively engageable with the timing gears for resetting thereof during rotation of the winding shafts.

References Cited in the file of this patent

UNITED STATES PATENTS

| | | |
|---|---|---|
| 296,738 | Fawkes | Apr. 15, 1884 |
| 300,753 | Austin | June 24, 1884 |